(12) United States Patent
Villanueva et al.

(10) Patent No.: US 8,310,548 B2
(45) Date of Patent: Nov. 13, 2012

(54) SYSTEM AND METHOD FOR VIDEO QUALITY PARAMETRIC TESTS

(75) Inventors: Rafael Villanueva, Clifton Park, NY (US); Vicente Miranda, Clifton Park, NY (US)

(73) Assignee: Contec LLC, Schenectady, NY (US)

( * ) Notice: Subject to any disclaimer, the term of this patent is extended or adjusted under 35 U.S.C. 154(b) by 484 days.

(21) Appl. No.: 12/605,080

(22) Filed: Oct. 23, 2009

(65) Prior Publication Data

US 2011/0096170 A1    Apr. 28, 2011

(51) Int. Cl.
*H04N 17/00* (2006.01)
*H04N 17/02* (2006.01)
(52) U.S. Cl. .................. 348/180; 348/181; 348/182
(58) Field of Classification Search .......... 348/180, 348/187, 182, 181, 188, 189, 193; 702/69, 702/108, 109, 111, 126; 714/25; 725/100, 725/87, 86; *H04N 17/00, 17/02*
See application file for complete search history.

(56) References Cited

U.S. PATENT DOCUMENTS

| | | | | |
|---|---|---|---|---|
| 5,748,230 | A * | 5/1998 | Orlando et al. | 348/187 |
| 6,741,277 | B1 * | 5/2004 | Rau | 348/181 |
| 7,038,710 | B2 | 5/2006 | Caviedes | |
| 7,180,538 | B2 | 2/2007 | Kim et al. | |
| 7,259,779 | B2 * | 8/2007 | Avadanei et al. | 348/193 |
| 7,450,639 | B2 | 11/2008 | Song | |
| 7,522,782 | B2 * | 4/2009 | Lim et al. | 382/275 |
| 7,573,530 | B2 * | 8/2009 | Zhong | 348/452 |
| 7,733,372 | B2 | 6/2010 | Ong et al. | |
| 2005/0183130 | A1 | 8/2005 | Sadja et al. | |
| 2006/0152585 | A1 | 7/2006 | Bourret et al. | |
| 2007/0013815 | A1 | 1/2007 | MacInnis | |
| 2007/0184373 | A1 | 8/2007 | Mertens | |
| 2008/0013854 | A1 | 1/2008 | Crete et al. | |

OTHER PUBLICATIONS

F. Pan et al., A Locally-Adaptive Algorithm for Measuring Blocking Artifacts in Images and Videos, Circuits and Systems, 2004. ISCAS '04. Proceedings of the 2004 International Symposium on Circuits and Systems, Issue Date: May 23-26, 2004, vol. 3, on pp. III-925-8 vol. 3, Print ISBN: 0-7803-8251-X , INSPEC Accession No. 8072901, Digital Object Identifier: 10.1109/ISCAS.2004.1328899.
Jin Li Gabbouj et al, Laplacian modeling of DCT coefficients for real-time encoding, Multimedia and Expo, 2008 IEEE international conference on multi media and expo ICME 2008 proceedings, Issue Date: Apr. 26, 2008, on pp. 797-800, Location: Hannover, Print ISBN: 978-1-4244-2570-9, INSPEC Accession No. 10178720, Digital Object Identifier: 10.1109/ICME.2008.4607555.
Robert Heslin,Search Report NPS #8099 Parametric Method for Determining Level of Noise in Video Pictures, National Patent Services, Arlington, VA, Mar. 19, 2009.
Ahmadi-Shokouh et al., Laplacian-preprocessed impulse-noise detection, with image denoising via difference-mean-filtering of long-range-correlated sub-images, Signals, Systems and Computers, 2004; Conference Record Thirty-Eighth Asilomar Conference on Signals, Systems and Computers 2004, Issue Date: Nov. 7-10, 2004, vol. 2, on pp. 1569-1572 vol. 2, ISSN:, Print ISBN: 0-7803-8622-1, INSPEC Accession No. 8504169, Digital Object Identifier: 10.1109/ACSSC.2004.1399419.

\* cited by examiner

*Primary Examiner* — Sherrie Hsia
(74) *Attorney, Agent, or Firm* — FSP LLC

(57) ABSTRACT

A method and system for automatically evaluating the quality of a signal transmitted by an imaging device. The amount of noise in the video signal is analyzed using an algorithm that does not require comparison to a template signal. The results of the algorithm determine whether the signal meets a pre-determined threshold value for signal quality.

17 Claims, 5 Drawing Sheets

SYSTEM AND METHOD FOR VIDEO QUALITY PARAMETRIC TESTS

FIELD

The invention relates to a method and system for evaluating video image quality. Specifically, this invention relates to a means for determining video image quality without comparing the image to a reference pattern. Herein, "image" refers to still or motion images (i.e. video).

BACKGROUND

Video providers seek to provide the clearest possible signal to an end user. While the clearest signal would be one that is sent from a nearby originating source directly to, an individual user, it is cost prohibitive to send signals in such a manner. Television signals are generally sent from a satellite to a cable television headend, or they may originate from digital files stored by a video server at the headend. The signal is then merged with locally generated content and advertising for distribution. In order to maximize available resources, signals are multiplexed so that multiple signals can be sent over a single communication channel. The multiplexed signal is received by an imaging device such as a set top box, demultiplexed and decoded and then sent to a video display device such as a television or computer screen. During this process, the video quality can degrade at one or more points resulting in an image that is not satisfactory for the viewer. While the quality of the video image can be instantly evaluated by human viewers, subjective testing is time consuming and is not useful for operational monitoring, line testing, or other types of periodic or continual monitoring and testing that are required to ensure the fidelity of a transmission. Subjective testing also varies according to the user's point of view.

Automated image evaluation systems compare the transmitted and/or decoded signals to a template or other "golden" standard signal. Such systems measure things like the Peak Signal to Noise Ratio (PSNR) using metrics such as Mean Squared Error calculations (MSE). Typical values for the PSNR in lossy image and video compression are between 30 and 50 dB, where higher is better. Acceptable values for wireless transmission quality loss are considered to be about 20 dB to 25 dB. However, PSNR does not always rank quality of an image or video sequence in the same way that a person would. Furthermore, the original video or template is generally not available at an arbitrary place for evaluation.

There is therefore a need in the art for an automated means of identifying degradation in a video image without requiring comparison to a reference image.

DETAILED DESCRIPTION

Overview

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

In some embodiments the present invention evaluates video impairments such as "noise" or "snow" in a video image by evaluating differences between nearby pixels. Such a process may be used on still or motion images produced, decoded, or transmitted by any type of imaging device (e.g. a set top box). In some embodiments, the evaluation is used to determine the functioning of the imaging device. The testing may be used with any type of imaging device such as a set top box or any other device that translates image signals and sends them to a display.

Detailed Description of Certain Embodiments

Figure 1:
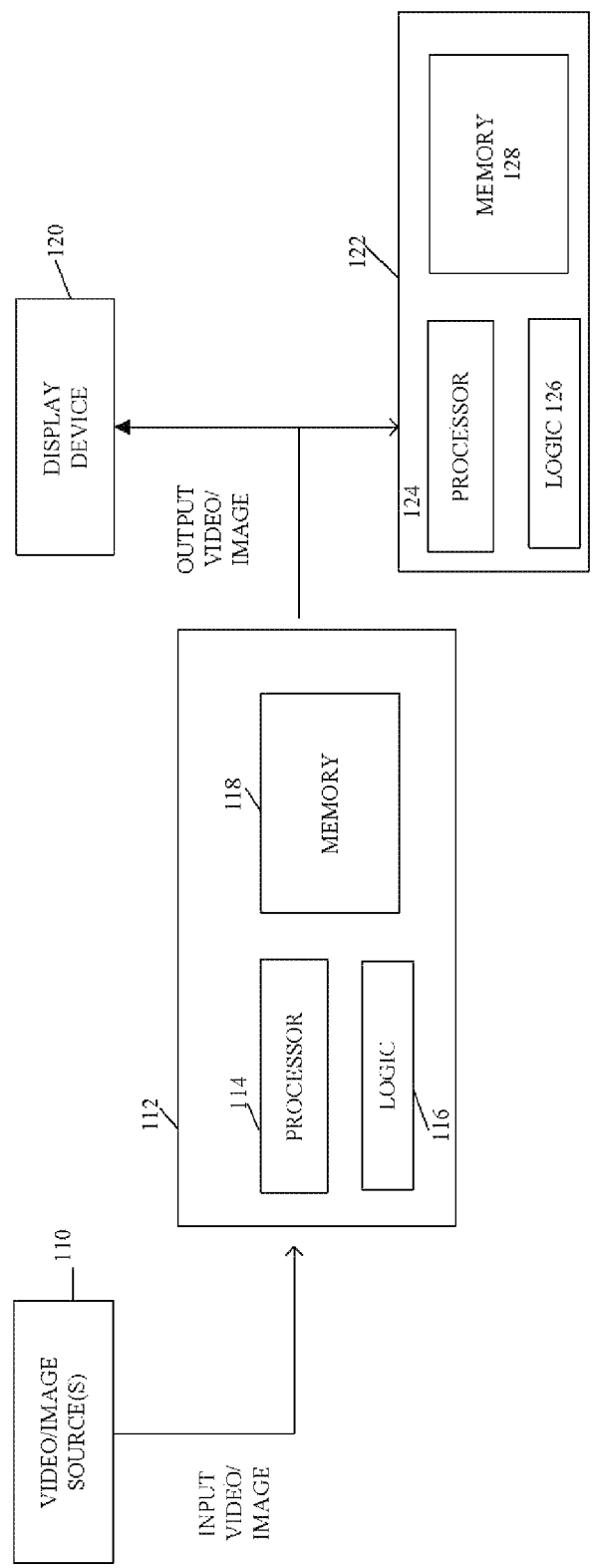
FIG. 1 illustrates a system for evaluating video quality according to an embodiment of the invention.

An exemplary imaging system 100 is shown in FIG. 1 where one or more video or image sources 110 sends a signal to an imaging device 112 such as a set top box. The imaging device 112 comprises a processor 114, memory 116 and logic 118. The imaging device 112 may also comprise other components generally found in a set top box including, but not limited to, a receiver and a modem. In some embodiments, the processor 114 and memory 116 may be part of a dedicated processor. The memory 116 may represent disk-based optical or magnetic storage units, electronic memories, as well as portions or combinations of these and other memory devices. In some embodiments, the memory may be in a separate device from the processor. The logic may be executed using an application-specific integrated circuit (ASIC), hardware, software or a combination thereof (see Implementations and Alternatives). The devices in system 100 may communicate by any means known to those skilled in the art, for example through a bus, a communication network, or one or more internal connections. In some embodiments, the communication may be wireless.

The term "processor" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included.

In some embodiments, the imaging device 112 may include an MPEG decoding processor and/or QAM (quadrature amplitude modulation) decoder. The imaging device may also comprise a graphics processor. Graphics processors are useful in processing graphics intensive data particularly 3-D data, associated with Internet browsing, gaming and multimedia applications such as those associated with MHEG (Multimedia and Hypermedia information coding Experts Group) set-top box applications.

The imaging device 112 decodes and reformats the signal and then sends the translated signal to a display device 120 and/or to a testing device 122. The display device 120 may be any sort of screen, monitor, television or other display medium generally used for displaying images. The testing device 122 may be any device used to monitor or test an imaging device such as a set top box. For example, the testing device 122 may be a QuickTest®-based automated solution.

In addition to transmitting signals, the imaging device 112 may also receive signals from the display device 120 or the testing device 122. In some embodiments, the imaging device 112 may also send signals back to the image source such as a head end. The testing device 122 may comprise a processor 124, logic 126 and memory 128. The memory 128 may represent disk-based optical or magnetic storage units, electronic memories, as well as portions or combinations of these and other memory devices. Like the imaging device, in some embodiments the memory of the testing device may be in a separate device from the processor. The logic may be implemented in many ways, for example using an application-specific integrated circuit (ASIC), hardware, software or a combination thereof. The devices may communicated by any means known to those skilled in the art, for example through a bus, a communication network, or one or more internal connections.

In some embodiments, the testing device 122 is coupled to a computer for use as a diagnostic tool using a web interface. In other embodiments, the diagnostic system is comprised by the testing device 122. The testing device 122 comprises logic described in further detail below and makes a determination regarding the quality of the signal transmitted by the imaging device 112. If the quality of the signal meets pre-set standards, the imaging device 112 is determined to be properly functioning. If the imaging device fails to meet the preset standards, the imaging device 112 is determined to require repair or replacement.

Figure 2:
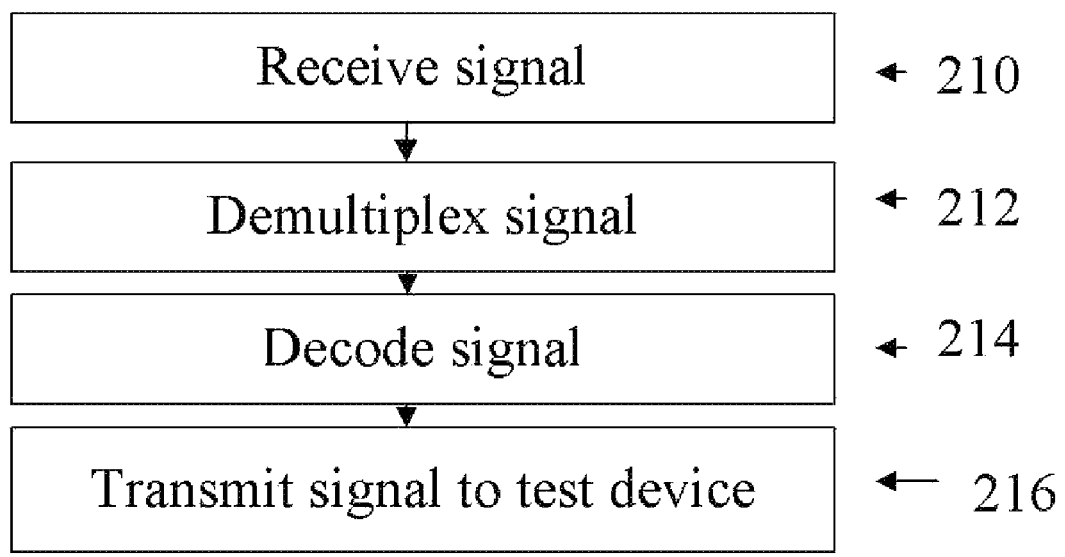
FIG. 2 illustrates a process for testing a signal according to an embodiment of the invention.

Referring to FIG. 2, a signal 210 is received from a head-end via a network to a coaxial cable or other receiving mechanism by an imaging device such as a set top box. Generally, data streams are multiplexed together into a transport stream so that many video and audio channels are received simultaneously, together with various services. The imaging device tunes a particular channel and service. Video data may be in an MPEG format (Moving Picture Experts Group) or other type of coded format and is decoded 214 into a signal that can be received by a testing or display device. In this instance, the decoded signal is sent to the testing device 216, for example using S-Video or CBVS.

Figure 3:
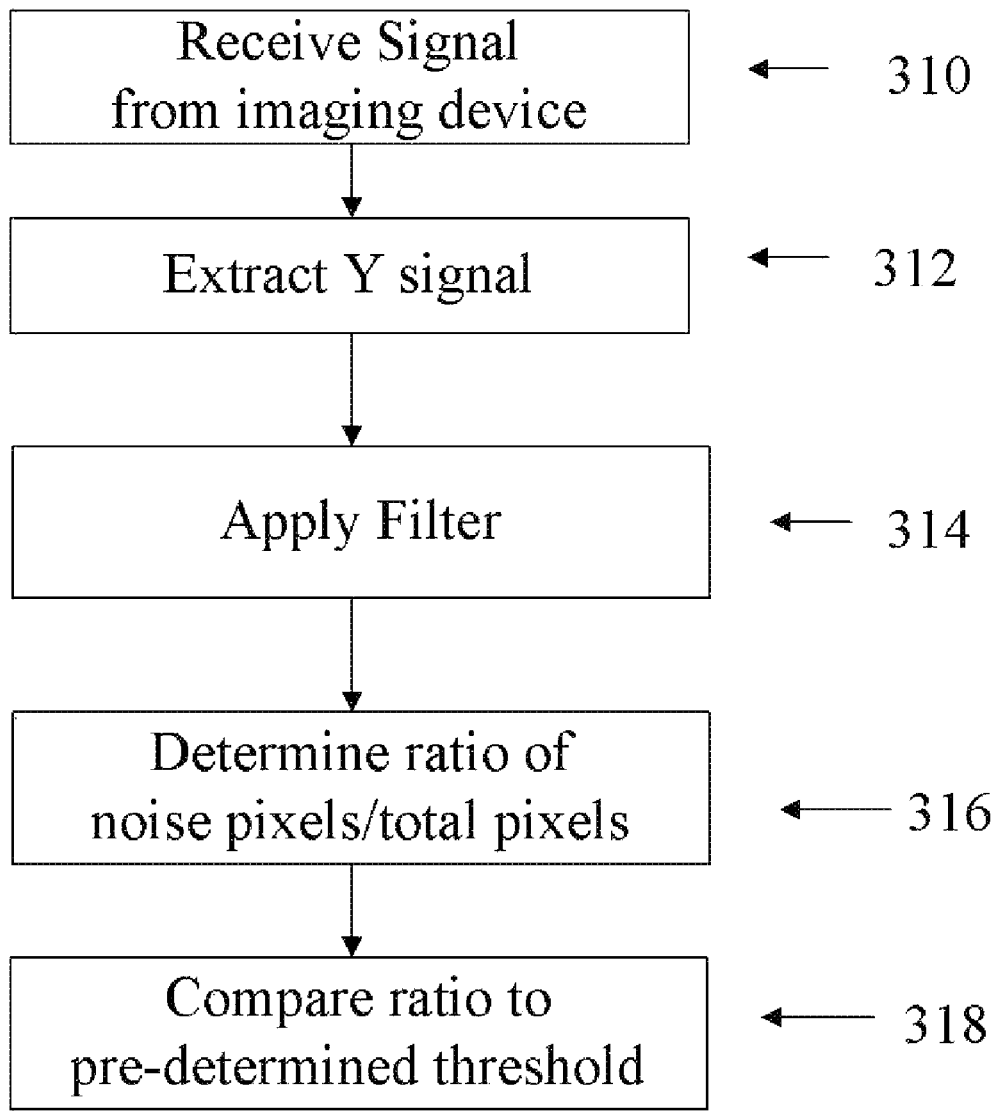
FIG. 3 illustrates a process for evaluating the amount of noise in a signal according to an embodiment of the invention.

As shown in FIG. 3, the test device receives the signal 310 from an imaging device. In some embodiments, the video signal may comprise smooth areas in the background of the images. In other embodiments, the signal may be a color bar or other solid test pattern. The Y component of the video signal is extracted 312. The Y component represents the luma information; however any component that conveys the brightness of an image may be used. Generally, the weighted values of R, G, and B are added together to produce a single Y signal, representing the overall brightness of a particular spot. A filter is applied 312 to identify noisy pixels. The filter is used to compute the second derivatives of an image which measure the rate at which the first derivatives change. This determines if a change in adjacent pixel values is an edge or a continuous progression.

The filter can be any filter which can be used to determine if a change in adjacent pixel values is an edge or a continuous progression. For example, the filter may be a Laplace filter or directional filter or any other filter that recognizes small changes in contrast around pixels. In one embodiment the filter is a $2^{nd}$ order Laplace Filter for the $2^{nd}$ spatial derivate of an image. It is omnidirectional (i.e. it can detect pixel change in any direction). The filter applies convolution with a kernel matrix of or similar to:

| -1 | -1 | -1 |
|----|----|----|
| -1 | 8  | -1 |
| -1 | -1 | -1 |

The ratio of noise pixels to total pixels is then determined 314 and compared to a pre-determined threshold 316. Results of the comparison may be used locally by the test device to identify the unit under test as faulty. In some embodiments the comparison may be sent to the head end. In other embodiments the comparison may result in a particular code appearing on the set top box or the testing device. In further embodiments, the ratio may be sent to a web interface for comparison to the pre-determined threshold for a particular model of imaging device.

Figure 4:
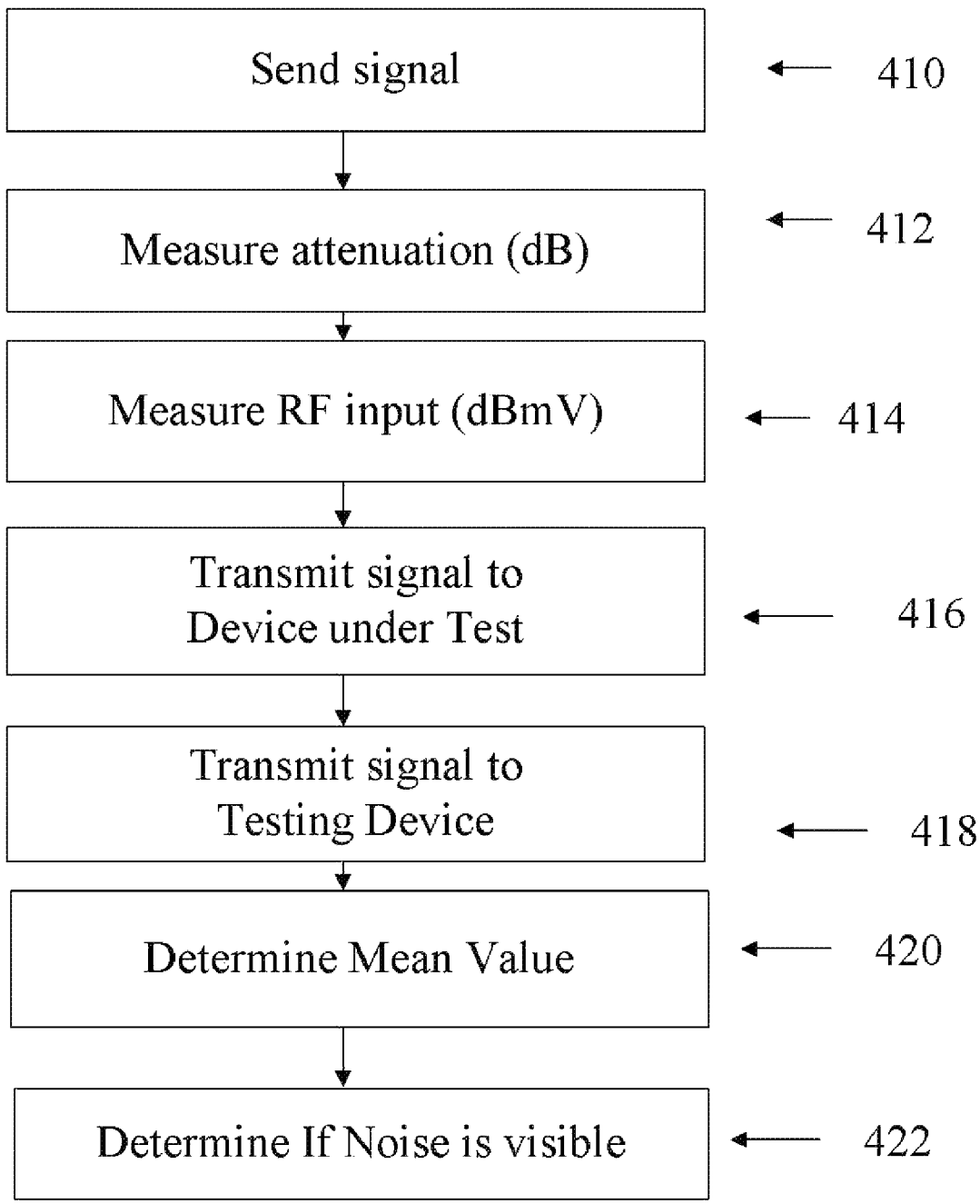
FIG. 4 illustrates a process for determining the acceptable amount of noise in a signal according to an embodiment of the invention.

As shown in FIG. 4, threshold values for excessive noise in a signal may be determined by sending a signal 410 to an imaging system. The signal is measured for attenuation 420 and then measured again 414 just prior to input into the device under test 416. The signal is provided to the testing device 418, the mean noise value determined 420, and from this value a determination is made whether the noise is 'visible' 422.

In one embodiment a National Instruments™ PXI-1411 may be employed to acquire the image. The image may be displayed in a CRT monitor to evaluate the picture quality and determine when the noise is visible for human vision. The amount of noise that enters in the device under test may be controlled via a programmable RF attenuator. The device under test's gain control may attempt to compensate for the noise. If the device under test is overstressed, the noise may become 'visible' as the device compensation is overwhelmed.

Figure 5:
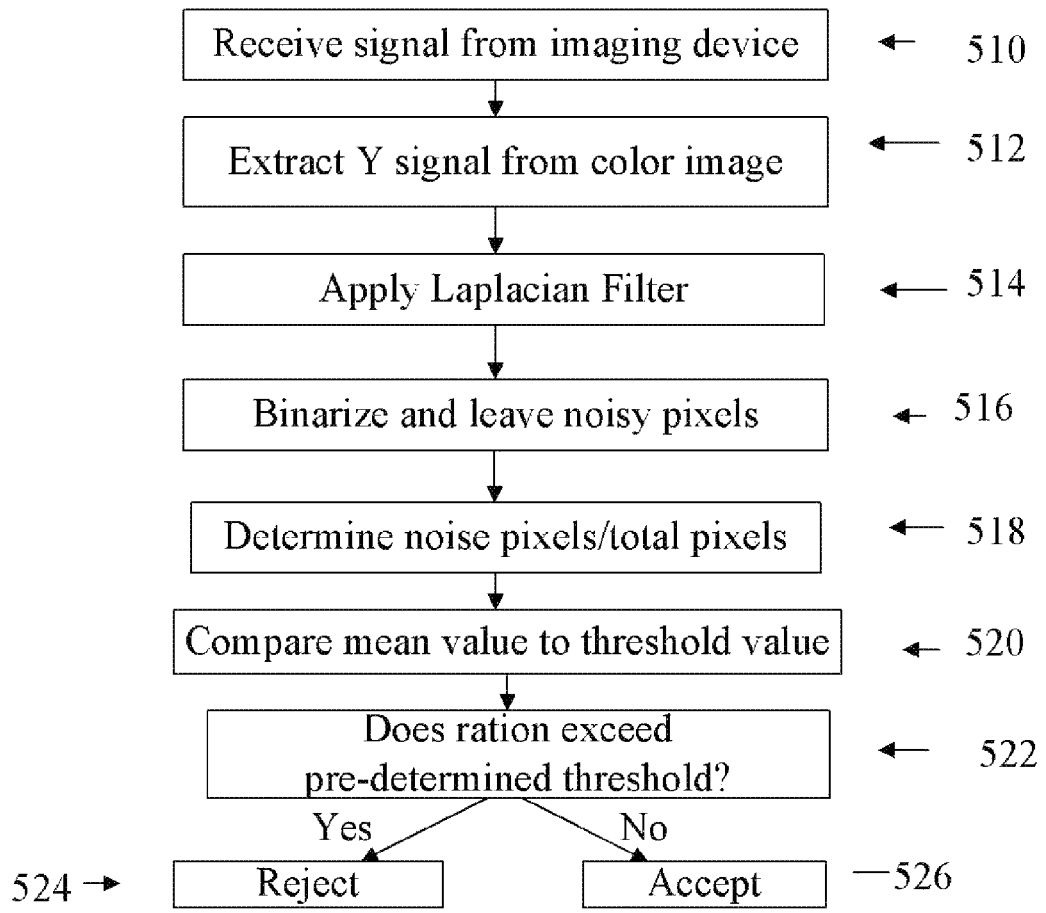
FIG. 5 illustrates a process for evaluating the amount of noise in a signal according to an embodiment of the invention.

In FIG. 5, a signal is received 510 by a testing device from the imaging device or other device under test. The testing device extracts the Y signal from the color image 520. In some embodiments, an image RGB format may be converted to other formats (e.g. HSL) before extraction of the luma component. A Laplace filter or other filter is applied 530 to recognize small changes in contrast around pixels. The image is then binarized and the noisy pixels are counted 540. The number of noisy and normal pixels are statistically analyzed and the ratio determined (mean value) 560. The mean value is compared to a threshold value determined by any means applicable, for example as in FIG. 4. If the mean value exceeds the pre-determined threshold, the signal is rejected 580. If the mean value is below the pre-determined threshold the signal is accepted. One or more rejected signals from a particular imaging device under test indicate that the device under test is faulty. In some embodiments, a pre-determined number of signals must be rejected before an imaging device is determined to be faulty.

Reporting that the device is faulty may result in a signal appearing in the testing device, a signal sent to the device under test, a signal sent to the head end or any other means of indicating that the imaging device under test is faulty.

Example Determination of Threshold Values

A signal was transmitted from the Contec headend to four SA 4200HD devices (Scientific Atlanta, San Jose, Calif.) tuned to Channel 53. The RF signal attenuation was measured prior to receipt by the SA 4200HD devices. The attenuation level was measured using a spectrum analyzer at a test point at the input of the SA4200HD and the RF level reading from SA4200HD determined therefrom.

The signal was then processed by the SA 4200HD devices and outputted to a IMAQ PXI-1411 Video Image Acquire Card (National Instruments, Austin, Tex.). The mean value of the attenuation was determined and the visibility of the noise in the video image was evaluated.

As shown below, a mean value of 2.3 or higher resulted in visible noise in the video image.

Measure of Noise in Analog Video Channel

| RF Attenuation (dB) | DUT RF Input (dBmV) | Mean Value | Noise Visible? |
|---|---|---|---|
| Unit #1 - SA 4200HD | | | |
| 0 | 0 | 0.03 | no |
| 6 | −5 | 0.04 | no |
| 9 | −9 | 0.06 | no |
| 12 | −12 | 0.15 | no |
| 15 | −14 | 0.64 | no |
| 18 | −18 | 2.5 | yes |
| Unit #2 - SA 4200HD | | | |
| 0 | 1 | 0.04 | no |
| 6 | −4 | 0.04 | no |
| 9 | −8 | 0.08 | no |
| 12 | −11 | 0.17 | no |
| 15 | −13 | 0.7 | no |
| 18 | −17 | 2.8 | yes |
| Unit #3 - SA 4200HD | | | |
| 0 | 1 | 0.04 | no |
| 6 | −4 | 0.04 | no |
| 9 | −8 | 0.07 | no |
| 12 | −11 | 0.14 | no |
| 15 | −14 | 0.55 | no |
| 18 | −17 | 2.3 | yes |
| Unit #4 - SA 4200HD | | | |
| 0 | 0 | 0.03 | no |
| 6 | −6 | 0.05 | no |
| 9 | −9 | 0.08 | no |
| 12 | −12 | 0.18 | no |
| 15 | −15 | 0.74 | no |
| 18 | −18 | 2.8 | yes |

Implementations and Alternatives

In general, the techniques, procedures, devices and systems described herein may be implemented via logic distributed in one or more devices. The particular distribution and choice of logic is a design decision that will vary according to implementation.

"Logic" refers to physical embodiments of signals and/or information that may be applied to influence the operation of a device. Software, hardware, electronic and optical memory, and firmware are examples of physical structure that may embody logic. Hardware logic may be embodied in circuits. In general, logic may comprise combinations of software, hardware, and/or firmware.

Those skilled in the art will appreciate that logic may be distributed throughout one or more devices, and/or may be comprised of combinations of instructions in memory, processing capability, circuits, and so on. Therefore, in the interest of clarity and correctness logic may not always be distinctly illustrated in drawings of devices and systems, although it is inherently present therein.

Those having skill in the art will appreciate that there are various logic implementations by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples comprise one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program, product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components comprised within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

We claim:

1. A method for measuring the amount of noise in a video image comprising:
   receiving a signal comprising image data from an imaging device;
   extracting a luma component from the image data;
   applying a filter to compute the second derivatives of the image data;
   determining from the second derivative a ratio of noise pixels to total pixels in the image data;
   comparing the ratio to a pre-determined ratio; and
   if the ratio exceeds the pre-determined ratio, the imaging device is determined to be faulty.

2. The method of claim 1, wherein the filter is a Laplace filter.

3. The method of claim 1, wherein pixels are binarized prior to determining the ratio of noise pixels to total pixels.

4. The method of claim 1, wherein the signal comprises smooth areas in the background of images.

5. The method of claim 1, wherein the signal comprises a color bar pattern.

6. The method of claim 1, wherein if the ratio exceeds the pre-determined ratio the signal is rejected.

7. The method of claim 1, wherein if the ratio is less than the pre-determined ratio the signal is accepted.

8. An apparatus for determining the functioning of an imaging device comprising;
   a processor;
   memory, coupled to the processor, wherein the memory is configured to allow the processor to:
   obtain a video signal;
   extract a luma component from the video signal;
   filter the luma component to determine a ratio of noise pixels to total pixels;
   compare the ratio of noise pixels to total pixels to a pre-determined ratio; and
   wherein if the processor determines that the ratio of noise pixels to total pixels exceeds the pre-determined ratio, the processor emits an error code indicating that the imaging device is non-functioning.

9. The apparatus of claim 8, wherein the filter is a Laplace filter.

10. The apparatus of claim 8, wherein the filter is an omnidirectional filter.

11. The apparatus of claim 8, wherein the filter recognizes small changes in contrast around pixels.

12. The apparatus of claim 8, wherein the luma component is the Y signal of a color image.

13. A system for video quality assessment comprising:
    a video imaging device;
    a testing device for measuring the amount of noise in a video picture obtained from the video imaging device;
    wherein the testing device comprises logic that enables determination of the amount of noise in the video picture by evaluating the contrast between neighboring pixels and calculating the ratio of noisy pixels to total pixels in the video picture; and the testing device comprises logic to control an RF attenuation of the video picture to induce noise in the video imaging device.

14. The system of claim 13, wherein the contrast between neighboring pixels is determined by applying a Laplace filter.

15. The system of claim 13, wherein the contrast between neighboring pixels is determined by applying an omnidirectional filter.

16. The system of claim 13, wherein the video imaging device sends a signal to the testing device.

17. The system of claim 13, wherein the contrast between neighboring pixels is determined in the Y signal.

* * * * *